United States Patent [19]

Peterson

[11] 4,203,245

[45] May 20, 1980

[54] FISHING LURE HOLDER

[76] Inventor: Jay B. Peterson, Rte. 3, Hudson, Wis. 54016

[21] Appl. No.: 916,562

[22] Filed: Jun. 19, 1978

[51] Int. Cl.² ............................................ A01K 97/06
[52] U.S. Cl. .................................. 43/25.2; 43/57.5 R
[58] Field of Search .............. 43/25.2, 54.5 R, 57.5 R, 43/25; 24/204, 257 R; 150/52 R; 229/93; 24/137 R, 138

[56] References Cited

U.S. PATENT DOCUMENTS

| | | | |
|---|---|---|---|
| D. 217,663 | 5/1970 | Chamberlain | 43/25.2 |
| 3,086,312 | 4/1963 | Davis | 43/25.2 |
| 3,190,027 | 6/1965 | Spangler | 43/25.2 |
| 3,941,159 | 3/1976 | Toll | 24/204 |
| 3,950,881 | 4/1976 | Hays | 43/25 |

FOREIGN PATENT DOCUMENTS 776393  1/1968  Canada .................................. 24/257 R

*Primary Examiner*—Nicholas P. Godici
*Attorney, Agent, or Firm*—Douglas L. Carlsen

[57] ABSTRACT

A packet for holding a fishing lure which lure is mounted on the line of a fishing rod, the packet comprising a sheet of flexible material having a thickness adapted to withstand unforced fishhook penetration. A clip adapted to engage and be frictionally secured on a fishing rod is permanently mounted along one edge of the sheet and the clip and the sheet both have interengageable and interconnectible means mounted thereon whereby the sheet may be wrapped around a lure disposed beside the clip and connected to the clip to secure the lure to the rod when the rod is not in use.

2 Claims, 3 Drawing Figures

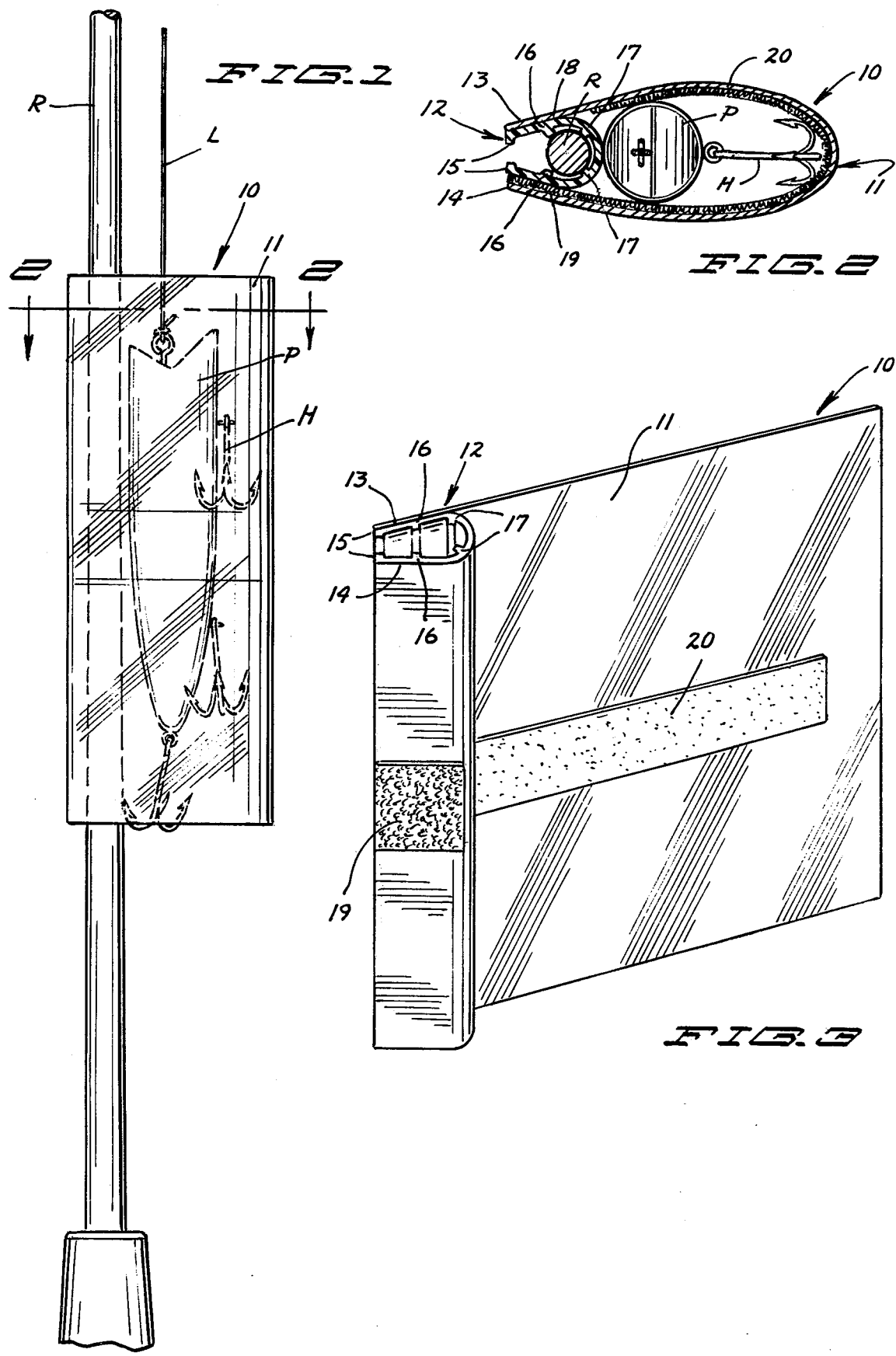

FISHING LURE HOLDER

BACKGROUND OF THE INVENTION

In the use of fishing equipment it is frequently desirable to leave a bait or a lure on the line between uses and yet secure it to the fishing rod so that the hooks thereon will not be injurious to people, garments or the like or snag on nearby items.

The problem is particularly acute where the lure in use has several independently suspended hooks such as is common with a fishing plug and the user wishes to temporarily discontinue use as when moving from one fishing area to another.

Others recognizing the problem have provided temporary storage facilities for a lure on the fishing rod. U.S. Pat. Nos. 3,484,980; 1,216,069; 3,800,456; 2,993,293; and 2,878,610 are exemplary of the same. It is felt, however, that these earlier attempts have not provided a practical solution to the problem for various reasons which will be readily understood after reading this disclosure.

SUMMARY OF THE INVENTION

The primary object of the present invention is to provide a new and improved container for holding a loose plug or other lure hanging on a fishing rod when not in use while yet permitting release of the lure for further use.

Another and more specific object of the invention is to provide a storage container or packet for a fishing lure on a rod which container is readily adaptable to hold lures of varying sizes and shapes and to cover and confine the hooks thereon from engaging outside articles.

With these and other objects in view the invention broadly comprises a storage packet for securing fishing lures to a fishing rod which comprises a rectangular sheet of relatively thick, yet flexible material which has a resilient U-shaped clip attached along one edge adapted to be frictionally gripped upon a fishing rod, with the clip and an opposing edge portion of the sheet each having strips of material thereon which will adhere to each other upon pressure contact whereby, as the sheet of material is wrapped around the lure and the hooks thereon and pressed into engagement with the clip, the lure will be held in a stored position adjacent to the rod.

BRIEF DESCRIPTION OF THE DRAWINGS

In the drawings,

FIG. 1 is an elevation of a lower portion of a fishing rod with the holder attached thereto and in encircling relation around a fishing lure mounted on the rod fishing line.

FIG. 2 is a slightly enlarged section through the rod and holder taken on line 2—2 of FIG. 1 looking downwardly and showing the top plug hook in an outwardly extending position.

FIG. 3 is a plan view of the holder in open condition and detached from the fishing rod.

DESCRIPTION OF THE PREFERRED EMBODIMENT

The packet or holder is denoted generally by the number 10 and comprises a rectangular sheet 11 of flexible rather heavy plastic or rubber-like material of sufficient thickness to resist the penetration of the pointed ends or barbs of fishing hooks. A channel shaped clip 12 of rigid but somewhat resilient material has one side wall 13, hereinafter referred to as the "inner wall", secured along one edge of sheet 11 by cementing, heat sealing, or the like as at 18.

Clip 12 is preferably extruded in elongated strips which are cut into sections of an appropriate length for secure attachment to a portion of a fishing rod. In the present disclosure the clip 12 has side walls 13 and 14 which are provided with opposing pairs of ribs 15, 16 and 17. The pairs or ribs 15 and 16 are positioned apart a distance to grip a relatively small rod while the ribs 16 and 17 frictionally grip a somewhat larger rod R as shown in FIG. 2.

The outer wall 14 of the clip 12 has a strip 19 of a material such as commercially available under the names "Velcro" or "Scotchmate" cemented thereto while sheet 11 carries a strip 20 of the same material which is interlockably compatible and interconnectible by pressure with strip 19.

In the drawing the packet is shown in use to store a fishing lure or plug P suspended from one end of a fishing line L having its other end connected to rod R or a reel mounted thereon. The plug shown has hooks H and a lowermost hook LH. When the fisherman wishes to store the plug P while yet leaving it on the line he slips the clip 12 into frictional engagement with the rod R and engages the hook LH under the clip 12 between ribs 17. The sheet 11 is then wrapped around the plug and strip 20 is pressed into interlocking engagement with strip 19.

Strip 20 extends along substantially the entire width of the sheet 11 so that it may be tightly wrapped around the lure and brought into interlocking engagement with strip 19, regardless of the horizontal dimensions of the lure. Accordingly, the packet is adjustable to tightly wrap around and secure any sized lure or plug P prohibiting any accidental displacement during storage. So held the lure P and the hooks H and LH mounted thereon are secured against the rod R and confined to prohibit any accidental engagement with other things.

When the plug P is to be used again the distal edge of sheet 11 is gripped and pulled away from the clip 12 disengaging strips 19 and 20 and releasing the lure. The clip 12 may be left on the rod or simply removed therefrom, as desired, depending upon the particular fishing conditions.

The invention described economically and effectively carries out the aforementioned objectives.

Having now therefore fully illustrated and described my invention, what I claim to be new and desire to protect by United States Letters Patent is:

1. Storage packet for fishing lures mounted on a fishing rod which comprises,
    (a) a sheet of relatively thick flexible material adapted to resist penetration of a fishhook upon unforced contact,
    (b) an elongated channel shaped clip having the exterior of one side wall affixed to one edge of the sheet with the channel opening outwardly away from the sheet, whereby the sheet may be first wrapped sidewise around a lure positioned against the exterior of the bottom wall of the clip and then engaged against the outside of the other side wall of the clip,
    (c) the said other side wall of the clip and the side of the sheet engaging the lure both having strips of material mounted thereon adapted to adhere to each other to secure the sheet around the lure and against the clip, and (d) the said strip on the sheet extending substantially along the entire width of the sheet perpendicular to the channel to permit adherence of said strips at different places to secure lures of different sizes.

2. The subject matter of claim 1 wherein the side walls of the clip are provided with longitudinally extending ribs adapted to engage against and grip the opposite sides of a fishing rod leaving spaces between the rod and clip walls when the clip is mounted on a rod.

* * * * *